(12) United States Patent
Sakamoto

(10) Patent No.: US 10,328,651 B2
(45) Date of Patent: Jun. 25, 2019

(54) RIGID CORE MOLD AND METHOD FOR MANUFACTURING PNEUMATIC TIRE USING THE SAME

(71) Applicant: SUMITOMO RUBBER INDUSTRIES, LTD., Kobe-shi, Hyogo (JP)

(72) Inventor: Masayuki Sakamoto, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 882 days.

(21) Appl. No.: 14/427,604

(22) PCT Filed: Sep. 12, 2013

(86) PCT No.: PCT/JP2013/074738
§ 371 (c)(1),
(2) Date: Mar. 11, 2015

(87) PCT Pub. No.: WO2014/054405
PCT Pub. Date: Apr. 10, 2014

(65) Prior Publication Data
US 2015/0246492 A1 Sep. 3, 2015

(30) Foreign Application Priority Data

Oct. 3, 2012 (JP) .................................. 2012-221592

(51) Int. Cl.
*B29D 30/06* (2006.01)
*B29D 30/12* (2006.01)
(Continued)

(52) U.S. Cl.
CPC .......... *B29D 30/0661* (2013.01); *B29C 33/76* (2013.01); *B29D 30/0601* (2013.01); *B29D 30/12* (2013.01); *B29L 2030/00* (2013.01)

(58) Field of Classification Search
CPC ............ B29D 30/0661; B29D 30/0601; B29D 30/12; B29C 33/76
See application file for complete search history.

(56) References Cited

U.S. PATENT DOCUMENTS

| 1,405,470 A | 2/1922 | Wheatley | |
| 6,113,833 A * | 9/2000 | Ogawa | B29D 30/12 156/110.1 |
| 2007/0009625 A1* | 1/2007 | Ogawa | B29D 30/0661 425/47 |
| 2008/0128947 A1* | 6/2008 | Sakamoto | B29D 30/0601 264/326 |

FOREIGN PATENT DOCUMENTS

| EP | 0 057 787 A1 | 8/1982 |
| JP | 2000-145790 A | 5/2000 |

(Continued)

OTHER PUBLICATIONS

Extended European Search Report, dated Jun. 27, 2016, for European Application No. 13843985.6.
International Search Report issued in PCT/JP2013/074738, dated Nov. 19, 2013.

*Primary Examiner* — Jacob T Minskey
*Assistant Examiner* — Melody Tsui
(74) *Attorney, Agent, or Firm* — Birch, Stewart, Kolasch & Birch, LLP

(57) ABSTRACT

A technique for easily taking out a main body of a core mold is proposed. An annular core-mold main portion 11 having a molding surface 18 for shaping an inner surface of a pneumatic tire is included, and the core-mold main portion 11 is composed of a plurality of segments each of which is taken out toward the inside in a radial direction. In the molding surface 18 of the core-mold main portion 11, a ratio Bd/W of a maximum width W lying in regions for shaping sidewall portions and a width Bd in the tire axial direction measured at toe-end shaping positions 18e for shaping toe (Continued)

ends of bead portions is not less than 0.80. In an inside zone 30 from the toe-end shaping position 18e of the molding surface 18 to the position of the maximum width W, the angle $\alpha$ of a tangent T drawn to the molding surface 18 is not more than 15 degrees. The inside zone 30 includes an oblique part 32 in which the angle $\alpha$ of the tangent T is 30 to 45 degrees, and a ratio h/H of a length h in a radial direction of the oblique part 32 and a length H from the toe-end shaping position 18e to an intersecting point P of a line drawn in the tire radial direction from the toe-end shaping position 18e outwardly in the radial direction with the molding surface 18 is less than 0.25.

21 Claims, 8 Drawing Sheets

(51) Int. Cl.
    *B29C 33/76*     (2006.01)
    *B29L 30/00*     (2006.01)

(56)     References Cited

FOREIGN PATENT DOCUMENTS

| | | |
|---|---|---|
| JP | 2005-41024 A | 2/2005 |
| JP | 2005-112444 A | 4/2005 |
| JP | 2011-161896 A | 8/2011 |
| JP | 2011-167979 A | 9/2011 |

* cited by examiner

RIGID CORE MOLD AND METHOD FOR MANUFACTURING PNEUMATIC TIRE USING THE SAME

TECHNICAL FIELD

The present invention relates to a rigid core mold having an outer surface for shaping the inner surface of a pneumatic tire and a method for manufacturing of a pneumatic tire using the same.

BACKGROUND ART

In order to improve the finishing accuracy of a tire, a method for manufacturing a pneumatic tire which utilizes a rigid core mold has been proposed in patent documents 1-2 for example.

In this manufacturing method, unvulcanized rubber members which become tire constructional members are applied in series on the outer surface of the rigid core mold, and a green
The tire constructional members are an inner liner, carcass ply, belt ply, sidewall rubber, tread rubber and the like.

The green tire is put in a vulcanization mold together with the rigid core mold and vulcanization-molded.
The rigid core mold is an inner mold. The vulcanization mold is outer mold.

The rigid core mold includes an annular core-mold main portion. The core-mold main portion has an outer surface equivalent to the inner surface of the tire. The core-mold main portion is split in a plurality of core segments.
After the vulcanization-molding, each core segment is pulled out inwardly in the tire radial direction from the vulcanized tire in series. Thereby, the rigid core mold is taken out through the bead portion side of the tire (Core-mold taking-out step).

As is commonly known, the cross-sectional shape of the inner surface of a pneumatic tire protrudes outwardly in the tire axial direction mostly in the sidewall portions.
In contrast, the width of the bead portions is less than the sidewall portions.
Accordingly, in order to take out the core segment from the tire, a particularly large force is required to pass through the bead portions.

In order to increase the production efficiency of the tire, it is necessary to save the labor to take out the core-mold main portion and to reduce the cycle time of the core-mold taking-out step.

PRIOR ART DOCUMENT

Patent Document

Patent document 1: JP-A-2011-161896
Patent document 2: JP-A-2011-167979

SUMMARY OF THE INVENTION

Problems to be Solved by the Invention

The present invention was made with the view to the above-mentioned actual circumstances, and a primary object is to provide a rigid core mold and a method for manufacturing a pneumatic tire in which, essentially by improving the shape of the molding surface of the core-mold main portion, the cycle time of a rigid core-mold taking-out step is reduced.

Means of Solving the Problems

An invention according to claim 1 of the present invention is a rigid core mold for manufacturing a pneumatic tire including an annular core-mold main portion having a molding surface for shaping the inner surface of a toroidal pneumatic tire having a tread portion, sidewall portions and bead portions,
the core-mold main portion composed of a plurality of core segments arranged in the tire circumferential direction and each taken out from the pneumatic tire by moving inwardly in the tire radial direction, and
the molding surface characterized in that,
in a meridian section of the core-mold main portion including a tire revolution axis,
the ratio Bd/W of a maximum width W in the tire axial direction lying in regions for shaping the sidewall portions, and a width Bd in the tire axial direction measured at toe-end shaping positions for shaping the toe ends of the bead portions is not less than 0.80,
an inside zone of the molding surface from the toe-end shaping positions to the position of the maximum width W has a width in the tire axial direction gradually decreasing toward the inside in the tire radial direction,
the angle $\alpha$ of the tangent to the molding surface in the inside zone is not more than 45 degrees with respect to a line in the tire radial direction,
the inside zone includes an oblique part where the angle $\alpha$ of the tangent is 30 to 45 degrees, and
the ratio h/H of the length h in the tire radial direction of the oblique part and the length H in the tire radial direction measured to an intersecting point at which a line in the tire radial direction drawn outwardly in the tire radial direction from the toe-end shaping position intersects with the molding surface is less than 0.25.

An invention as set forth in claim 2 is the rigid core mold as set forth in claim 1 wherein
the molding surface is provided in the inside zone with a maximum inclination position at which the angle $\alpha$ of the tangent becomes maximum, and
a region inside in the tire radial direction from the maximum inclination position includes an inverse arc part formed by an arc having its center outside the core mold.

An invention as set forth in claim 3 is the rigid core mold as set forth in claim 2 wherein
the ratio Hr/h of the length H in the tire radial direction of the inverse arc part and the length h in the tire radial direction of the oblique part is 0.50 to 0.83.

An invention as set forth in claim 4 is the rigid core mold as set forth in claim 2 or 3 wherein
the angle $\alpha$ of the tangent at the maximum inclination position is 40 to 44 degrees.

An invention as set forth in claim 5 is the rigid core mold as set forth in any one of claims 1-4, wherein
the ratio Bd/W is 0.80 to 0.84.

An invention as set forth in claim 6 is the rigid core mold as set forth in any one of claims 1-5, wherein
the ratio h/H is 0.15 to 0.22.

An invention as set forth in claim 7 is a method for manufacturing a pneumatic tire utilizing the rigid core mold as set forth in any one of claims 1-6, which is characterized by including
a green tire forming step for forming a green tire by applying unvulcanized tire constructional members on an outer surface of the rigid core mold in series, a vulcanization step for putting the green tire in a vulcanization mold together with the rigid core mold and vulcanization-molding it, and a core-mold taking-out step for taking out each core segment from the pneumatic tire after the vulcanization-molding by moving each core segment inwardly in the tire radial direction.

Effects of the Invention

In the present invention, the molding surface of the core-mold main portion has the ratio Bd/W not less than 0.80, which ratio is of the maximum width W in the tire axial direction lying in the regions for shaping the sidewall portions and the width Bd in the tire axial direction at the toe-end shaping positions for shaping the toe ends of the bead portions. Namely, a pneumatic tire shaped by the rigid core mold of the present invention is formed such that the width between the toe ends is relatively wide.
Accordingly, when the core segment is taken out from the tire, the resistance (frictional force) of the core segment during passing through between the toe ends of the bead portions is reduced.

In the inside zone of the molding surface from the toe-end shaping position to the position of the maximum width W, the rigid core mold of the present invention is gradually decreased in the width in the tire axial direction toward the inside in the tire radial direction. In the inside zone, the angle α of the tangent drawn to the molding surface is not more than 45 degrees with respect to the line in the tire radial direction. Namely, in the core-mold main portion of the present invention, the inclination angle α of the inside zone with respect to in the tire circumferential direction is small. Therefore, it becomes easy to take out each core segment toward the inside in the tire radial direction.

The inside zone of the rigid core mold of the present invention includes the oblique part where the angle α of the tangent becomes 30 to 45 degrees. The ratio h/H of the length h in the tire radial direction of the oblique part and the length H in the tire radial direction from the toe-end shaping position to the intersecting point is less than 0.25. The intersecting point is the point at which the line in the tire radial direction drawn outwardly in the tire radial direction from the toe-end shaping position intersects with the molding surface. By limiting the range of the oblique part as being small as explained above, it becomes more easy to take out the core segment toward the inside in the tire radial direction.

The rigid core mold of the present invention which fulfill the above-mentioned configurations reduces the labor to take out the core segments from the tire and consequently shortens the cycle time of the core-mold taking-out step.

MODE FOR CARRYING OUT THE INVENTION

An embodiment of the present invention will now be described in conjunction with the drawings.

Figure 1:
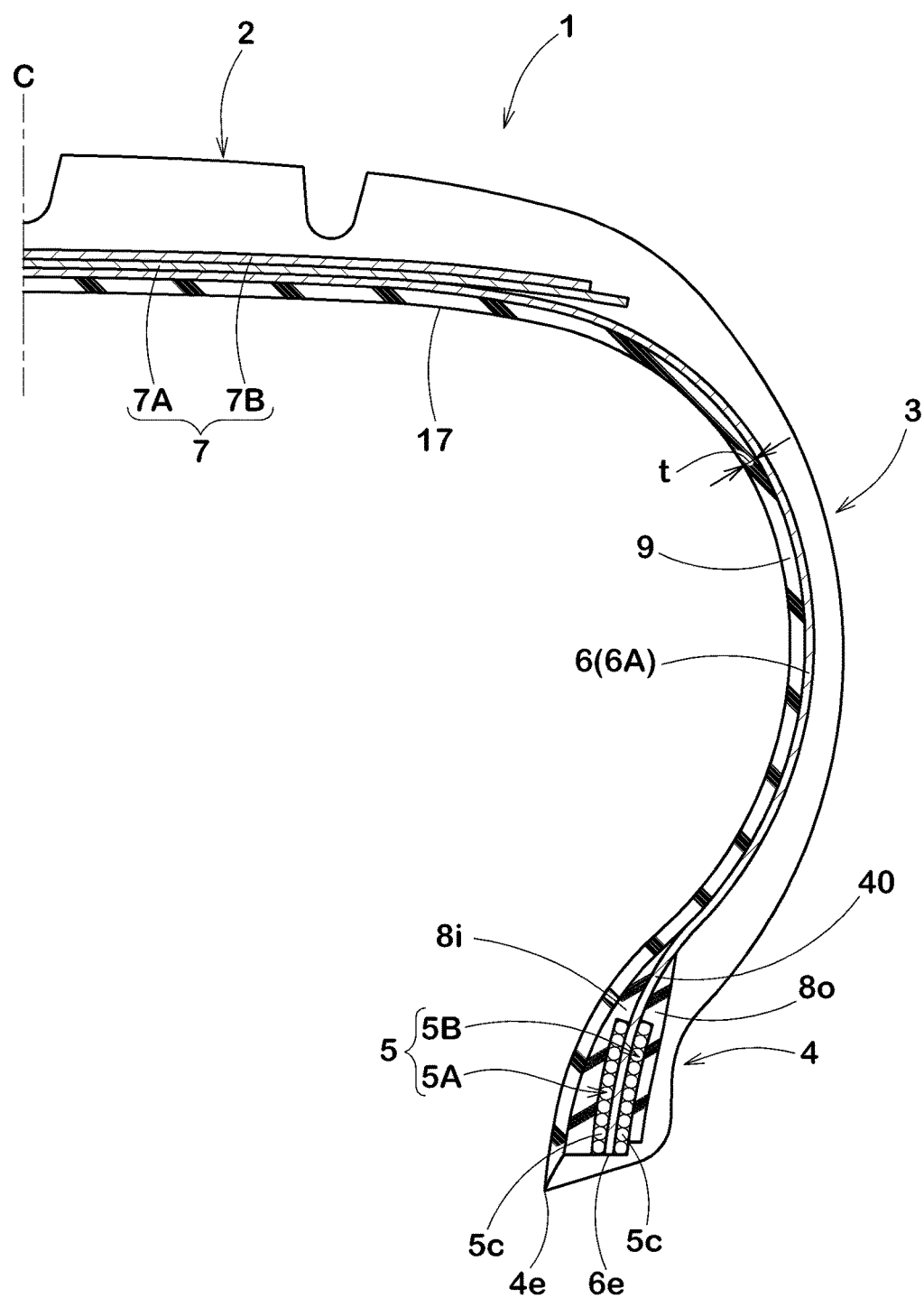
FIG. 1 A cross sectional view showing an example of the pneumatic tire manufactured by a manufacturing method of the present embodiment.

The rigid core mold in the present embodiment is utilized to manufacture a pneumatic tire 1 such as shown in FIG. 1.

In FIG. 1, a passenger radial tire is shown as an example of the pneumatic tire 1.

The pneumatic tire 1 is toroidal, having a tread portion 2, sidewall portions 3, and bead portions 4.

The pneumatic tire 1 includes a carcass 6, a belt layer 7 and an inner liner 9.

The carcass 6 extends from the tread portion 2 to a bead core 5 of the bead portion 4 through the sidewall portion 3.

The belt layer 7 is disposed on the outside in the tire radial direction of the carcass 6 in the tread portion 2.

The inner liner 9 is disposed inside the carcass 6.

As is commonly known, the pneumatic tire 1 is formed so that the sidewall portion 3 projects outwardly in the tire axial direction than the bead portion 4.

The carcass 6 includes a carcass ply 6A.

The carcass ply 6A is composed of a layer of carcass cords arranged at an angle of 75 to 90 degrees with respect to the tire equator C for example.

Organic fiber cords, for example, polyester and the like are used as the carcass cords.

The carcass ply 6A extends between the bead portions 4, 4 in a toroidal form.

The inner ends 6e in the tire radial direction of the carcass ply 6A terminate in the bead portions 4 without being turned up.

The bead core 5 is disposed in the bead portion 4.

The bead core 5 includes an inside core 5A and an outside core 5B. The inside core 5A is disposed inside the carcass ply 6A in the tire axial direction. The outside core 5B is disposed outside the carcass ply 6A in the tire axial direction. The inside core 5A and the outside core 5B are ring-shaped. In the inside core 5A and the outside core 5B, a bead wire 5c made of steel is helically overlap-wound around the tire revolution axis.

On the inner surface in the tire axial direction of the inside core 5A, an inner apex rubber 8i is disposed.

On the outer surface in the tire axial direction of the outside core 5B, an outer apex rubber 8o is disposed.

The apex rubber 8i, 8o is formed from hard rubber.

The apex rubber 8i, 80o is formed so as to taper toward the outside in the tire radial direction.

The belt layer 7 is composed of two inner and outer belt plies 7A, 7B. The belt ply 7A, 7B is a layer of belt cords arranged so as to incline at an angle of 10 to 40 degrees with respect to the tire equator C for example. In the belt plies 7A, 7B, the belt cords are superimposed and oriented so as to cross each other. Steel cords or organic fiber cords for example aramid and the like are used as the belt cords.

The inner liner 9 is disposed so as to extend between the toe ends 4e, 4e of the bead portions 4 in a toroidal form. The inner liner 9 is disposed over the entire area of the inner surface of the tire 17. The inner liner 9 is made of an air-nonpermeable rubber material. For example, a butyl based rubber can be suitably used as the air-impermeable rubber material. The butyl based rubber contains not less than 60 parts by mass, preferably not less than 80 parts by mass, more preferably 100 parts by mass of butyl rubber (or its derivative) with respect to 100 parts by mass of rubber component.

The thickness t of the inner liner 9 is for example about 0.5 to 2.0 mm.

Figure 2:
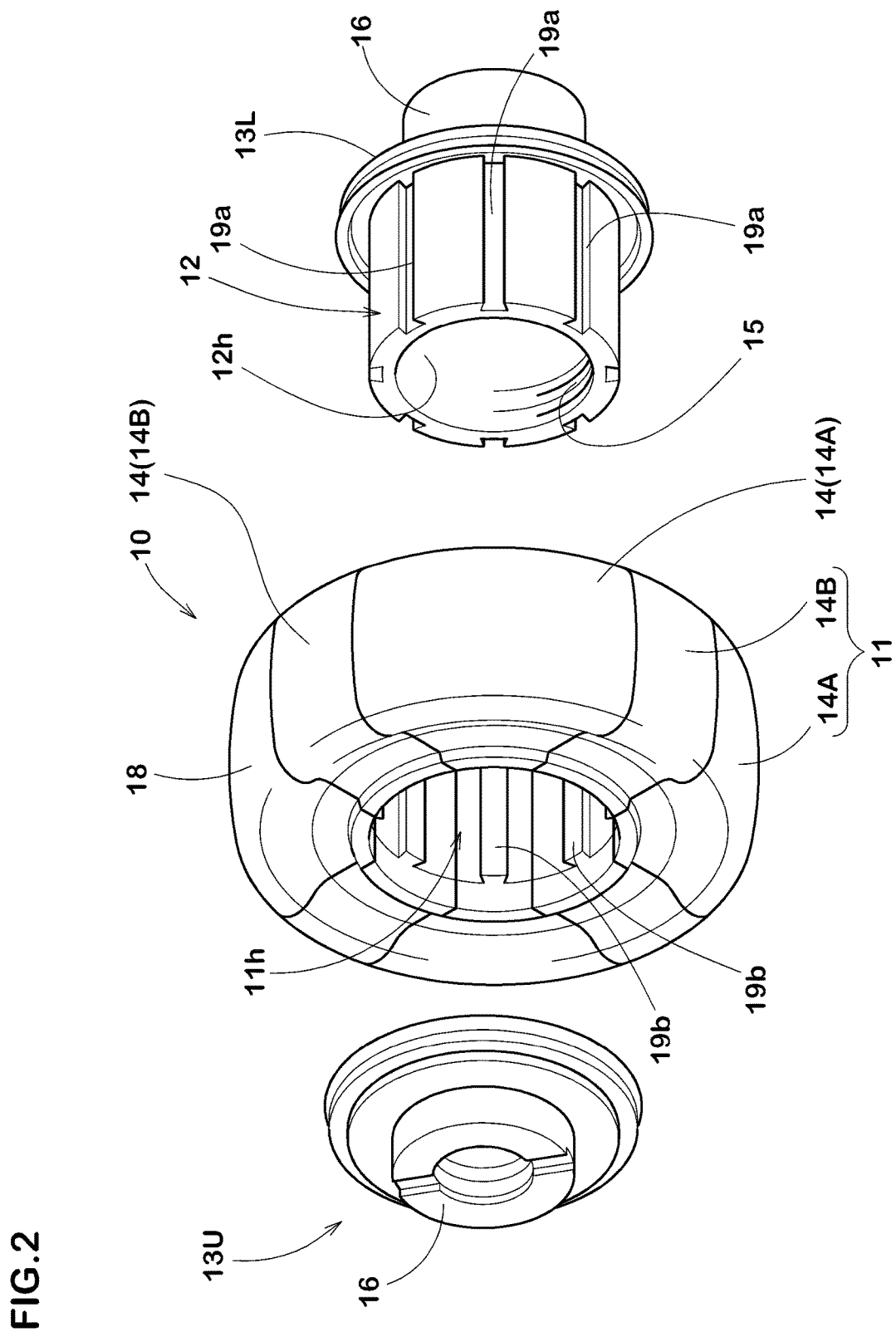
FIG. 2 An exploded perspective view showing an example of the rigid core mold.
Figure 3:
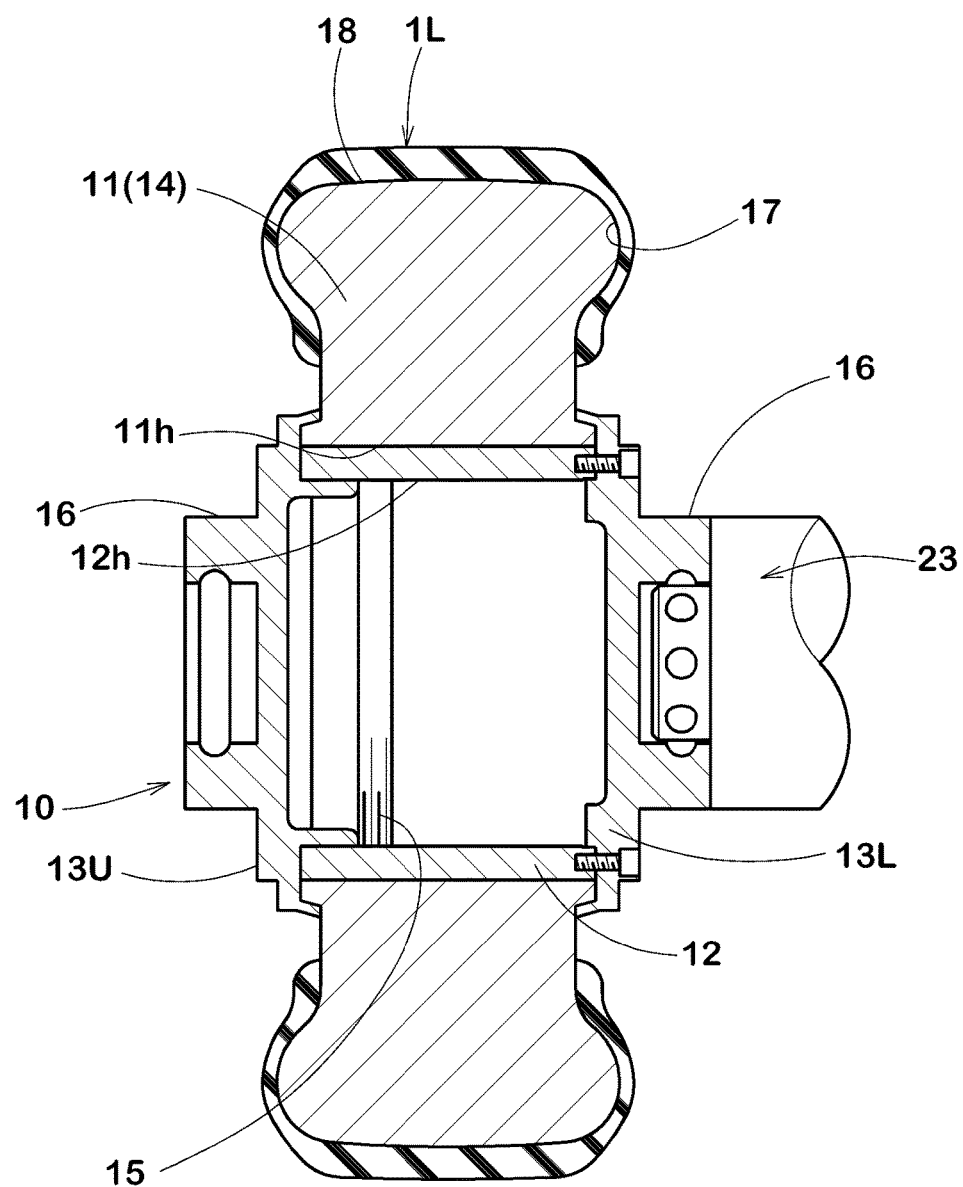
FIG. 3 A cross sectional view of the rigid core mold where the green tire is formed.

In FIG. 2, an exploded perspective view of the rigid core mold 10 is shown. In FIG. 3, a cross sectional view of the rigid core mold 10 is shown.

As shown in FIG. 2 and FIG. 3, the rigid core mold 10 includes an annular core-mold main portion 11, a core 12 and a pair of side wall bodies 13L, 13U.

The core-mold main portion 11 has a bore 11h.

The core 12 is inserted in the bore 11h of the core-mold main portion 11.

The side wall bodies 13L, 13U are disposed separately from each other in the direction of the axis of the core-mold main portion 11.

The outer surface of the core-mold main portion 11 forms the molding surface 18.

The molding surface 18 shapes the inner surface 17 of the pneumatic tire 1. In other words, after the vulcanization-molding, the inner surface 17 of the pneumatic tire 1 in FIG. 1 accords with the molding surface 18 of the core-mold main portion 11.

The core-mold main portion 11 is composed of a plurality of core segments 14 split in the tire circumferential direction.

Figure 4:
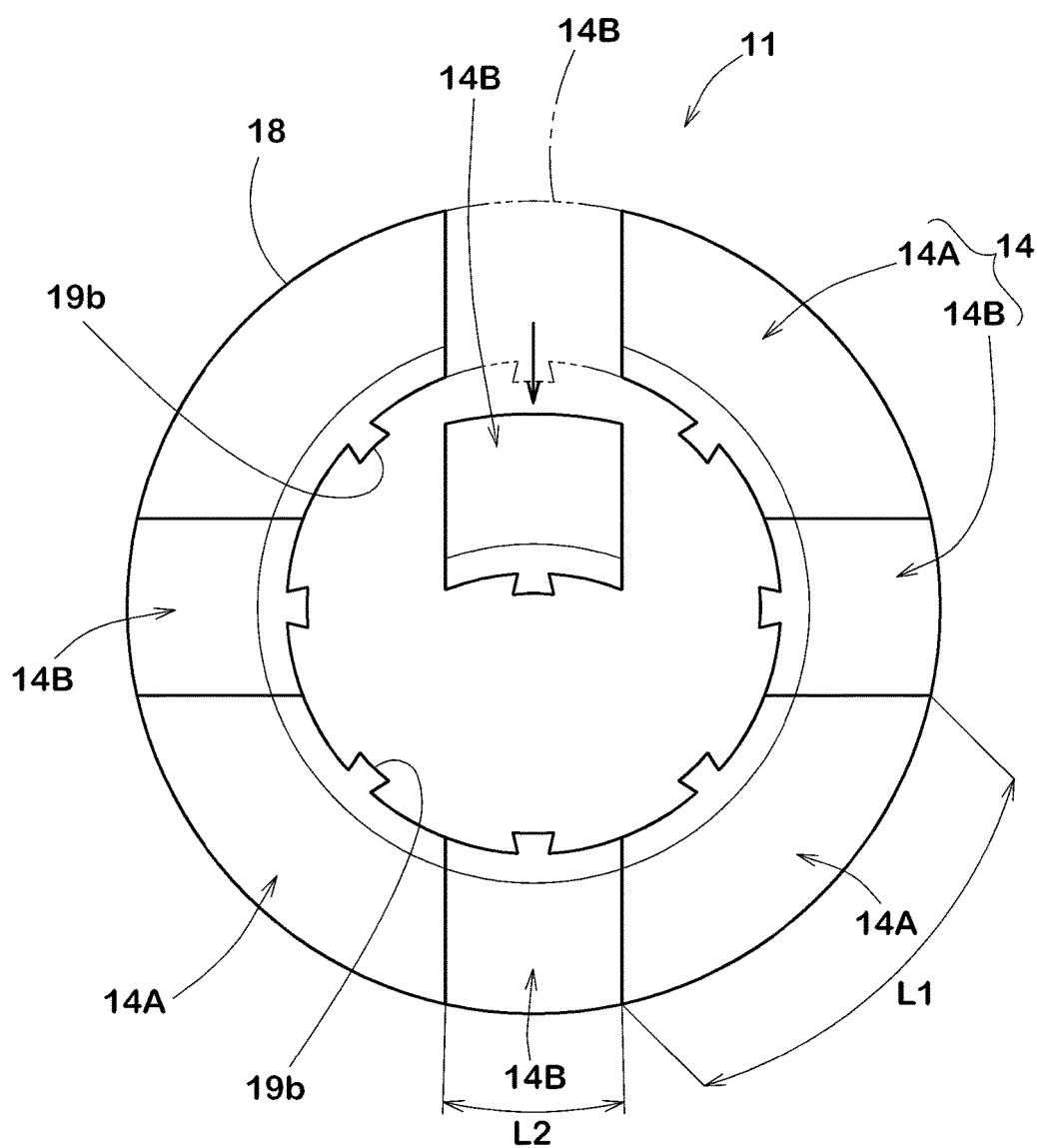
FIG. 4 A side view of the core-mold main portion from a direction of the axis.

As shown in FIG. 4, the core segments 14 include first core segments 14A and second core segments 14B.

The length L1 in the circumferential direction, of the first core segment 14A gradually decreases toward the inside in the tire radial direction.

The length L2 in the circumferential direction, of the second core segment 14B gradually increases toward the inside in the tire radial direction.

The first core segments 14A and the second core segments 14B are alternately arranged in the tire circumferential direction. Thereby, the core-mold main portion 11 becomes an annular body continuous in the tire circumferential direction.

Figure 5:
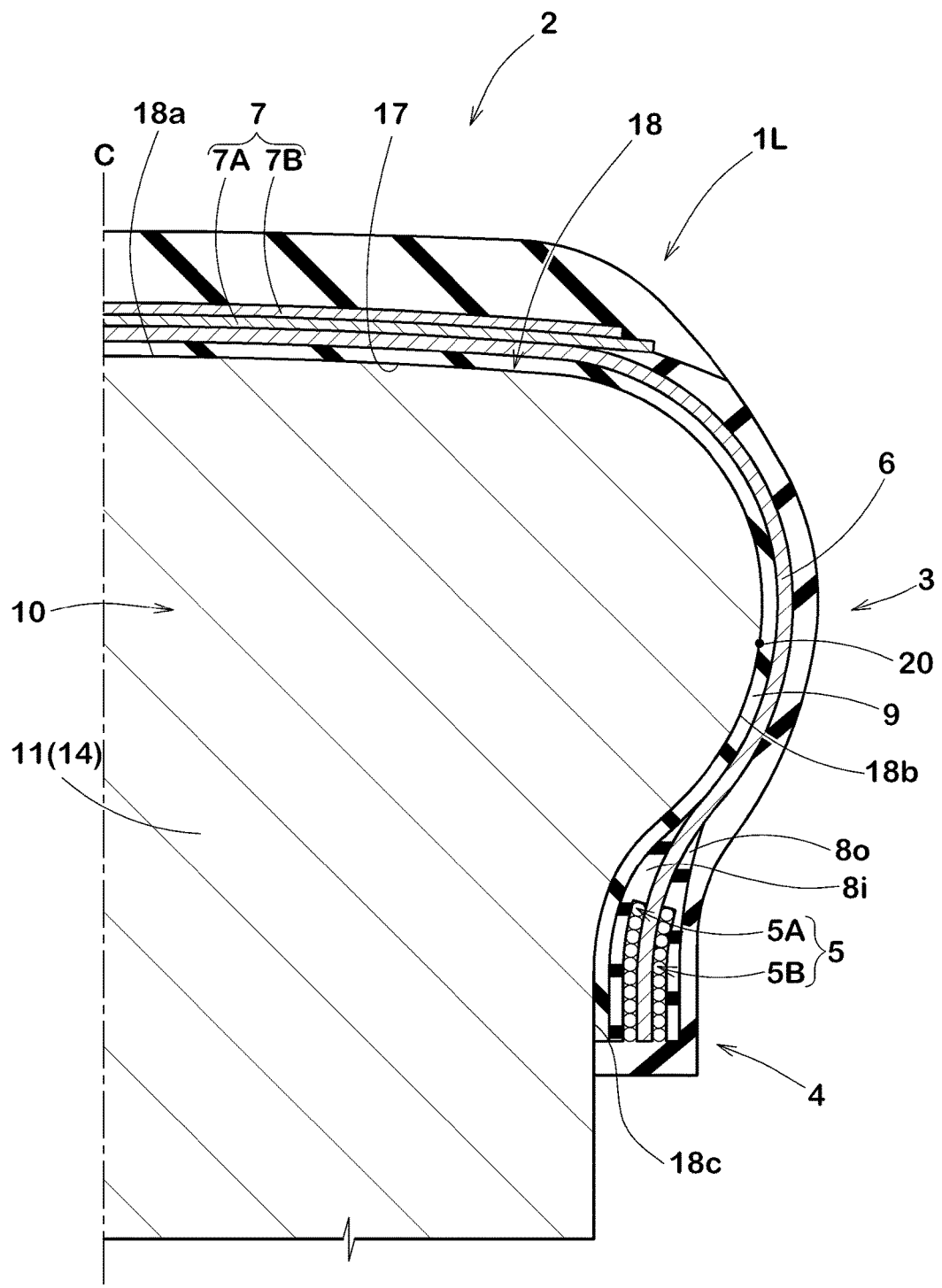
FIG. 5 A cross sectional view of the green tire formed on the outer surface of the rigid core mold.

As shown in FIG. 5, the molding surface 18 of the core-mold main portion 11 includes a tread molding surface 18a, sidewall molding surfaces 18b, and bead molding surfaces 18c. The tread molding surface 18a shapes the inner surface 17 of the tread portion 2 of the pneumatic tire 1 (green tire 1L).

The sidewall molding surfaces 18b shape the inner surfaces 17 of the sidewall portions 3. The bead molding surfaces 18c shape the inner surfaces 17 of the bead portions 4.

The sidewall molding surfaces 18b are formed so as to project outwardly in the tire axial direction than the bead molding surfaces 18c. The sidewall molding surfaces 18b include a maximum width position 20 having a maximum width W in the tire axial direction.

As shown in FIG. 2 and FIG. 3, the core 12 is cylindrical. As shown in FIG. 3, the core 12 is inserted in the bore 11h of the core-mold main portion 11.

In the outer circumferential surface of the core 12, there are formed dovetail grooves 19a extending in the direction of the axis of the rigid core mold 10. In the inner circumferential surface of the core segment 14A, 14B, there is formed a dovetail tenon 19b extending in the direction of the axis of the rigid core mold 10. The dovetail grooves 19a and the dovetail tenons 19b are engaged with each other.

If the core 12 is inserted in the bore 11h, the first core segments 14A and the second core segment 14B are prevented from moving in the tire radial direction and in the tire circumferential direction.

As shown in FIG. 3, one of the side wall bodies 13L is fixed to one side of the core 12 in the direction of the axis with bolts.

The other side wall body 13u is fixed to the other side in the direction of the axis, of the core 12. The other side wall body 13u is fixed to an internal thread portion 15 detachably by being screwed therein. The internal thread portion 15 is formed in the bore 11h of the core 12.

As shown in FIG. 3, a pair of side wall bodies 13L, 13U prevent the core-mold main portion 11 from moving in the direction of the axis of the core 12.

The outer surface of each side wall body 13L, 13U is provided with a support shaft part 16 protruding outwardly in the direction of the axis. A chuck part 23 is detachably coupled with the support shaft part 16. The chuck part 23 is for example, a conveyer (not shown) or the like for conveying the rigid core mold 10 to the vulcanization mold or the like.

As shown in FIG. 5, unvulcanized tire members and the like are applied onto the outside of the molding surface 18 of the rigid core mold 10. Thereby, the green tire 1L is formed.

Figure 6:
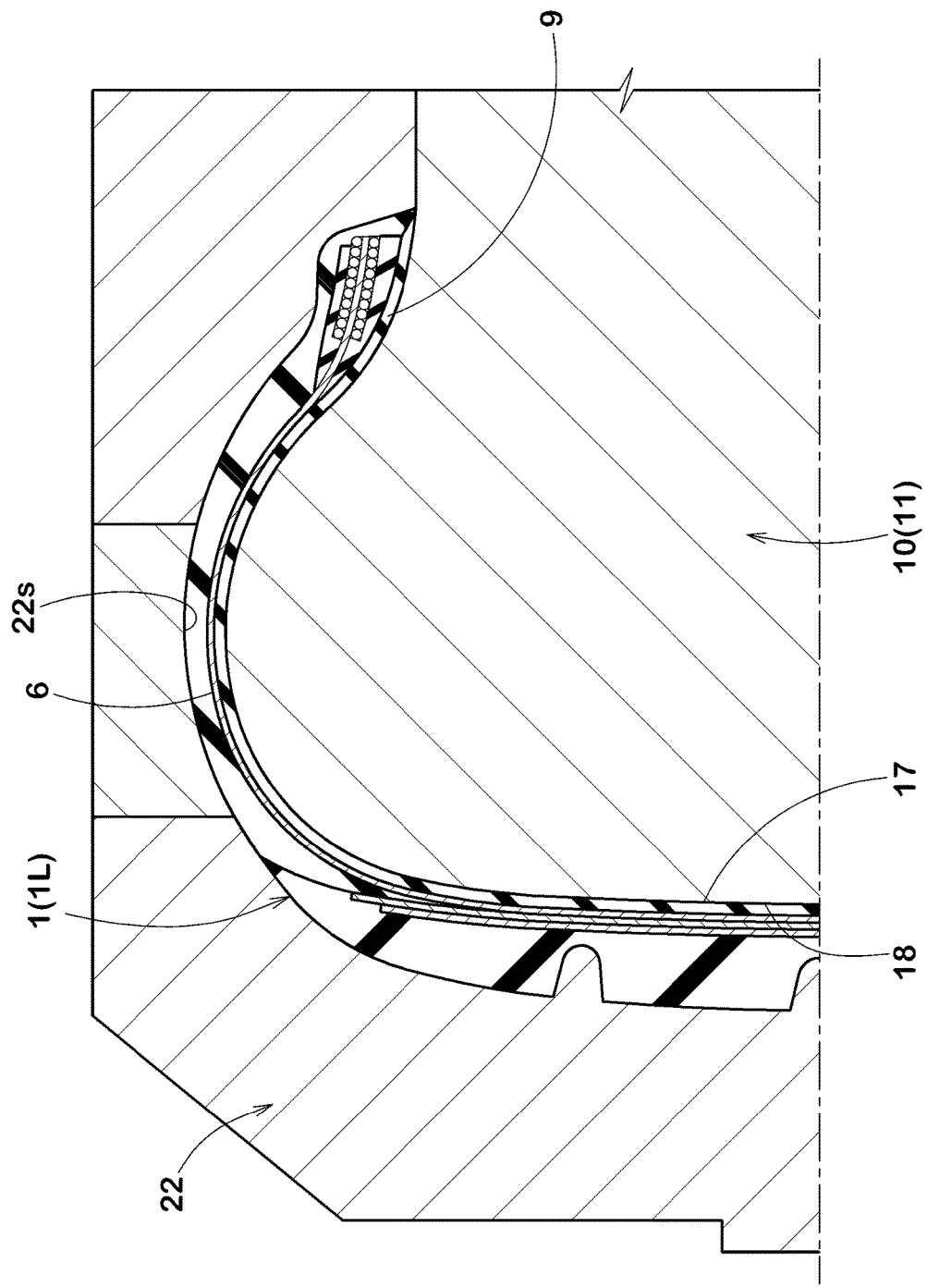
FIG. 6 A cross sectional view for explaining the vulcanization step.

As shown in FIG. 6, the green tire 1L is put in the vulcanization mold 22 together with the rigid core mold 10. The vulcanization mold 22 has a cavity 22s for forming the outer surface of the green tire 1L.

The green tire 1L is vulcanization-molded so that the outer surface coincides with the cavity 22s, and the inner surface 17 coincides with the molding surface 18 of the core-mold main portion 11.

Figure 7:
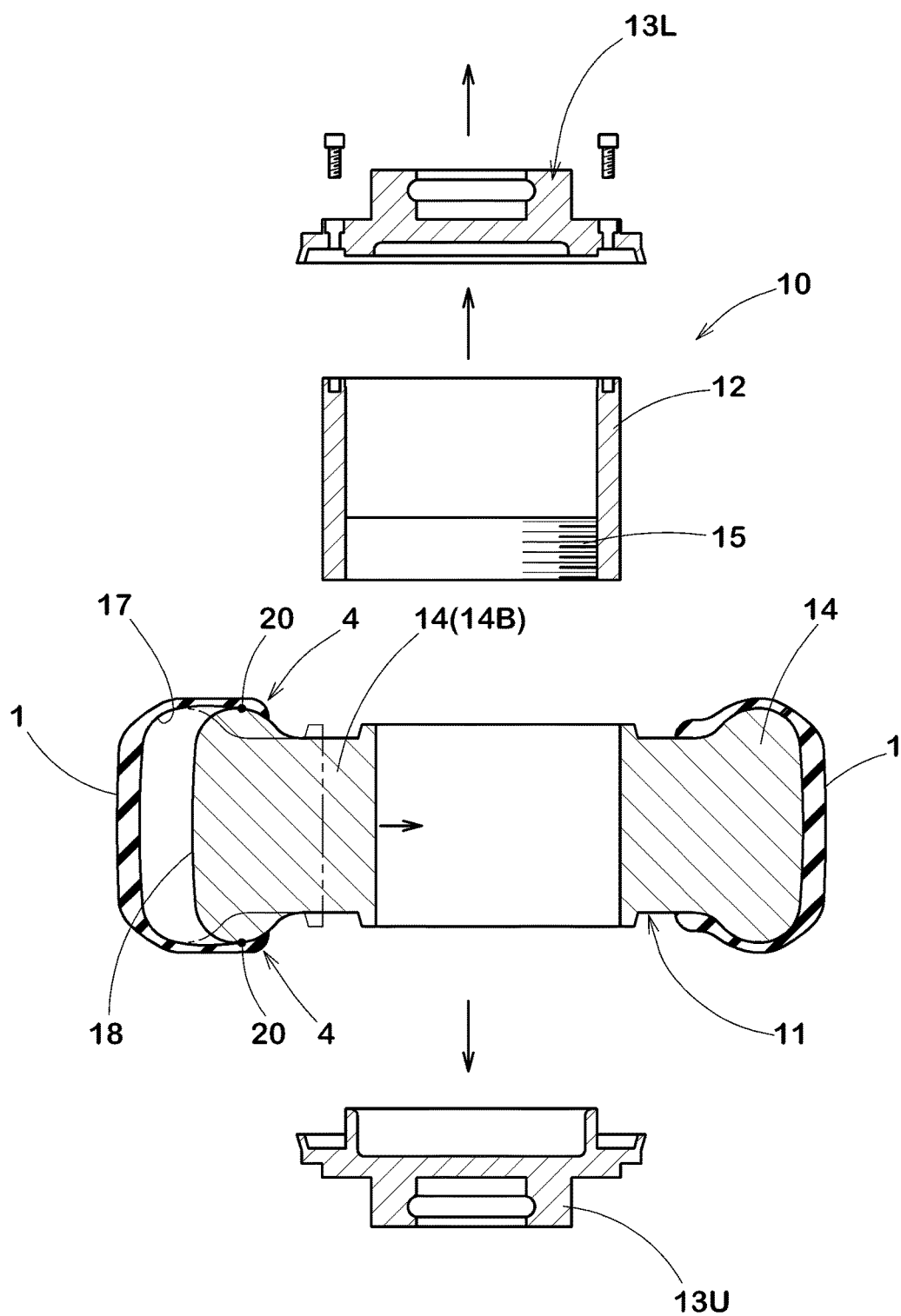
FIG. 7 An exploded cross sectional view for explaining the rigid core mold taking out step.

After the vulcanization, the vulcanized tire 1 is taken out from the vulcanization mold 22 together with the rigid core mold 10. As shown in FIG. 7, the side wall bodies 13L, 13U and the core 12 are removed from the rigid core mold 10. Thereby, on the inside of the pneumatic tire 1, only the core-mold main portion 11 is remained.

Next, the first core segments 14A and the second core segments 14B of the core-mold main portion 11 are pulled out inwardly in the tire radial direction in order. Namely, the core-mold main portion 11 is taken out from the inside of the pneumatic tire 1, while being disassembled.

Figure 8:
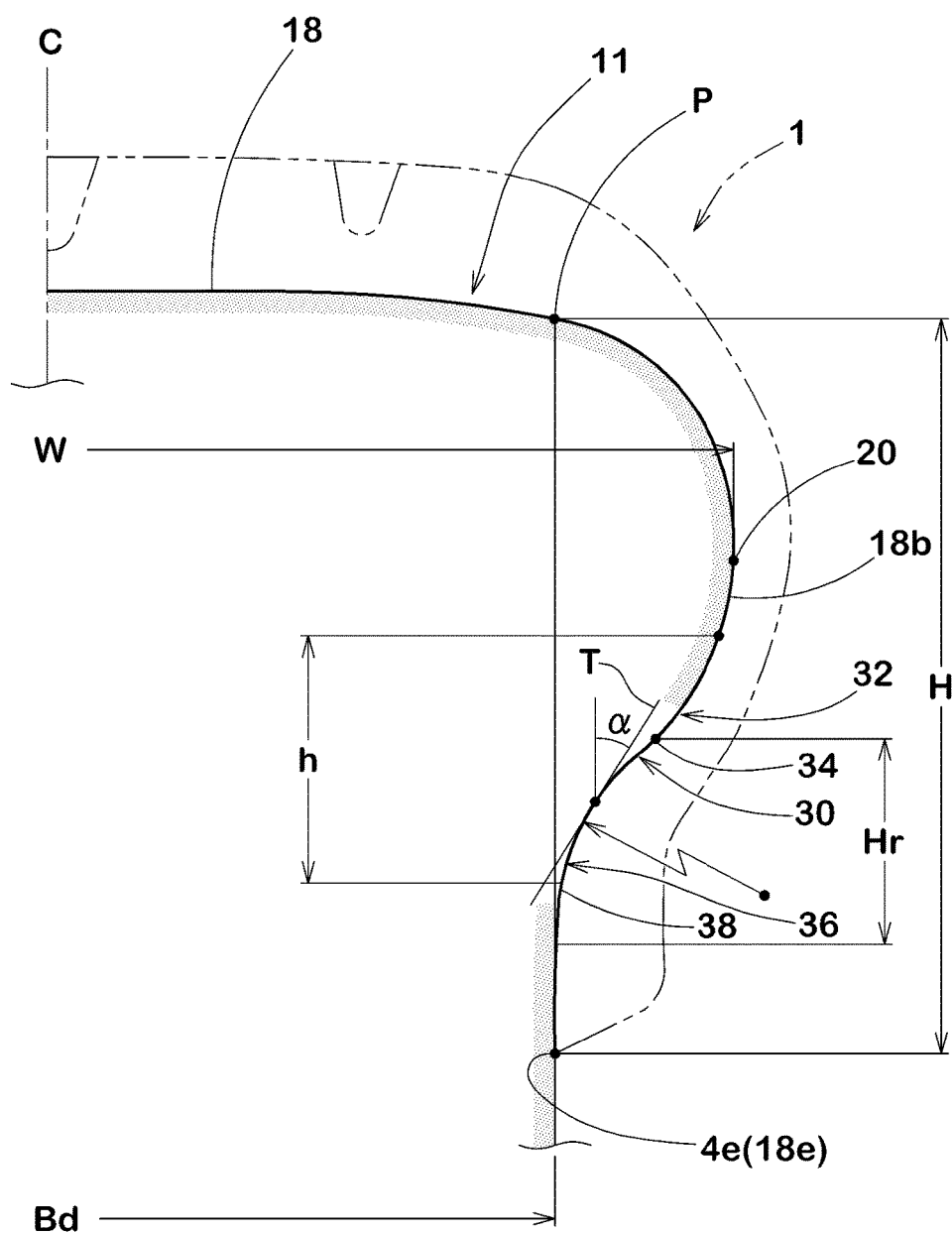
FIG. 8 A cross sectional view of the core-mold main portion including a tire revolution axis.

As shown in FIG. 8, in the meridian section of the core-mold main portion 11 including the tire revolution axis, the molding surface 18 is such that the ratio Bd/w of a maximum width W and a width Bd between the toe ends 4e is not less than 0.80.

The maximum width W is a maximum width in the tire axial direction which lies in the sidewall molding surfaces 18b. The width Bd between the toe ends 4e is the width in the tire axial direction at the toe-end shaping positions 18e for shaping the toe ends 4e of the bead portions.

In other words, the pneumatic tire 1 vulcanization-molded with the core-mold main portion 11 of the present invention, is formed such that the width Bd between the toe ends 4e becomes relatively larger.

When the core segment 14 is taken out through the bead portion side of the pneumatic tire 1, the maximum width position 20 of the core segment 14 passes, while increasing the width Bd between the toe ends 4e, 4e.

Namely, the resistance (frictional force) during the maximum width position 20 of the core segment 14 passes through between the toe ends 4e, 4e of the bead portions, becomes small by making the vulcanization-molding so that the width Bd between the toe ends 4e is large.

Accordingly, it becomes easy to take out the core segments 14 through the bead portion side of the pneumatic tire 1.

From results of various tests conducted by the inventor and others, it was discovered that if the ratio Bd/W is not less than 0.80, the foregoing effect can be exerted remarkably. According to the increase in the ratio Bd/W, it becomes easier to take out the core segment 14 from the tire 1. However, if the width Bd between the toe ends 4e, 4e is very large, the bead portions need to be largely deformed in order to mount the pneumatic tire 1 on a rim. Therefore, the tire mounting performance deteriorates.

Further, there is a possibility that the profile of the carcass is deformed and the rolling resistance and the tire weight are increased.

Therefore, the ratio Bd/W is preferably not more than 0.84, more preferably not more than 0.83.

The inside zone 30 is the zone from the toe-end shaping position 18e to the maximum width position 20.

In the inside zone 30, the width in the tire axial direction of the molding surface 18 of the core-mold main portion 11 is gradually decreased toward the inside in the tire radial direction.

Further, in the inside zone 30, the angle α of the tangent T drawn to the molding surface 18 is not more than 45 degrees with respect to a line in the tire radial direction.

When the core segment 14 is taken out through the bead portion side of the pneumatic tire 1, the maximum width position 20 of the core segment 14 moves toward the toe end 4e, while contacting with the inner surface 17 of the inside zone 30 of the pneumatic tire 1.

At this time, if the angle α of the tangent drawn to the molding surface 18 in the inside zone 30 is large, the frictional force of the core segment 14 with the inner surface 17 during being taken out becomes large.

Therefore, the taking out of the core segment 14 from the pneumatic tire 1 is deteriorated.

Therefore, the present invention is intended to reduce the frictional force between the inner surface 17 of the inside zone 30 and the core segment 14 by setting the angle α as being not more than 45 degrees.

Thereby, the taking out of the core segment 14 from the pneumatic tire 1 becomes more easy.

The inside zone 30 includes an oblique part 32 in which the angle α of the tangent T is 30 to 45 degrees.

The oblique part 32 gives a large frictional force to the core segment when taking out the core segment 14.

Therefore, it is preferable that the length h in the tire radial direction of the oblique part 32 is limited in a certain range. In the present invention, the ratio h/H of the length h in the tire radial direction of the oblique part 32 and the length H in the tire radial direction from the toe-end shaping position 18e to the intersecting point P is less than 0.25.

Thereby, the frictional force between the inner surface 17 of the inside zone 30 and the core segment 14 is reduced. From the results of the various tests, it is especially preferable that the ratio h/H is 0.15 to 0.22.

The intersecting point P is the point at which the line in the tire radial direction drawn outwardly in the tire radial direction from the toe-end shaping position 18e intersects with the molding surface 18.

The inside zone 30 of the molding surface 18 includes a maximum inclination position 34 at which the angle α of the tangent T becomes maximum.

In this example, the angle α of the tangent T is gradually increased from the toe-end shaping position 18e to the maximum inclination position 34 and then gradually decreased from the maximum inclination position 34 to the maximum width position 20. At the maximum inclination position 34, the angle α of the tangent T is not more than 45 degrees. At the maximum inclination position 34, the angle α of the tangent T is preferably 40 to 44 degrees.

A region 36 inside in the tire radial direction from the maximum inclination position 34 of the molding surface 18 includes an inverse arc part 38 formed by an arc having its center outside the core mold.

As shown in FIG. 1, such inverse arc part 38 forms an inverse arc part 40, which is formed by an arc having its center outside the tire, on the carcass ply 6A of the pneumatic tire 1.

Such inverse arc part 40 of the pneumatic tire 1 forms a large space in the tire cavity as the direction of curvature of the carcass cords is reversed (namely, the inverse arc part 40 changes to the arc having its center within the tire).

Thereby, the taking out of each of the core segments of the core-mold main portion 11 becomes easy.

It is preferable that the ratio Hr/h of the length H in the tire radial direction of the inverse arc part 38 and the length h in the tire radial direction of the oblique part 32 is 0.50 to 0.83.

While description has been made of particularly preferable embodiments of the present invention, the present invention can be carried out by modifying into various embodiments without being limited to the illustrated embodiments.

Embodiments

Rigid core molds for manufacturing a passenger pneumatic tire of size 235/40R18 having the basic structure of FIG. 1 were experimentally manufactured according to the specifications shown in Table 1. The rigid core molds were tested for the performance. Test methods are as follows <Cycle Time of Core-Mold Taking-Out Step>

Utilizing each rigid core mold, pneumatic tires were manufactured, and the cycle time of the step for taking out the core mold therefrom was measured. The results are indicated by the cycle time (second). The smaller the number, the easier the taking out of the core mold, namely, it is better.

<State of Inner Surface of Tire after Taking Out Core Mold>

The inner surface of the pneumatic tire manufactured by using each rigid core mold was visually inspected to confirm the presence or absence of damage. The results of the test are shown in Table 1.

TABLE 1

|  | comparative example1 | embodiment 1 | embodiment 2 | embodiment 3 | comparative example2 | embodiment 4 | embodiment 5 |
|---|---|---|---|---|---|---|---|
| number of core segments | 8 | 8 | 8 | 8 | 8 | 8 | 8 |
| maximum width W of core-mold main portion (mm) | 242 | 234 | 226 | 242 | 238 | 238 | 238 |
| width Bd between toe-end shaping positions (mm) | 191 | 191 | 191 | 201 | 201 | 201 | 201 |
| ratio Bd/W | 0.79 | 0.82 | 0.85 | 0.83 | 0.84 | 0.84 | 0.84 |

TABLE 1-continued

| | | | | | | | |
|---|---|---|---|---|---|---|---|
| maximum angle (alpha) in inside zone (deg.) | 44 | 44 | 44 | 44 | 47 | 45 | 43 |
| length h of oblique part (mm) | 17 | 17 | 17 | 17 | 17 | 17 | 17 |
| length H (mm) | 79 | 79 | 79 | 79 | 79 | 79 | 79 |
| ratio h/H | 0.22 | 0.22 | 0.22 | 0.22 | 0.22 | 0.22 | 0.22 |
| length Hr of inverse arc part (mm) | 10.0 | 10.0 | 10.0 | 10.0 | 10.0 | 10.0 | 10.0 |
| ratio Hr/h | 0.59 | 0.59 | 0.59 | 0.59 | 0.59 | 0.59 | 0.59 |
| cycle time of core-mold taking-out step (sec.) | 273 | 221 | 209 | 212 | 284 | 210 | 200 |
| damage of tire inner surface after taking out core mold | no | no | no | no | present | no | no |

| | embodiment 6 | embodiment 7 | comparative example3 | embodiment 8 | embodiment 9 | embodiment 10 | embodiment 11 |
|---|---|---|---|---|---|---|---|
| number of core segments | 8 | 8 | 8 | 8 | 8 | 8 | 8 |
| maximum width W of core-mold main portion (mm) | 238 | 238 | 238 | 238 | 238 | 238 | 238 |
| width Bd between toe-end shaping positions (mm) | 201 | 201 | 201 | 201 | 201 | 201 | 201 |
| ratio Bd/W | 0.84 | 0.84 | 0.84 | 0.84 | 0.84 | 0.84 | 0.84 |
| maximum angle (alpha) in inside zone (deg.) | 40 | 38 | 44 | 44 | 44 | 44 | 44 |
| length h of oblique part (mm) | 17 | 17 | 20 | 17 | 14 | 12 | 10 |
| length H (mm) | 79 | 79 | 79 | 79 | 79 | 79 | 79 |
| ratio h/H | 0.22 | 0.22 | 0.25 | 0.22 | 0.18 | 0.15 | 0.13 |
| length Hr of inverse arc part (mm) | 10.0 | 10.0 | 10.0 | 8.5 | 7.0 | 6.0 | 5.0 |
| ratio Hr/h | 0.59 | 0.59 | 0.50 | 0.50 | 0.50 | 0.50 | 0.50 |
| cycle time of core-mold taking-out step (sec.) | 197 | 189 | 262 | 201 | 195 | 190 | 187 |
| damage of tire inner surface after taking out core mold | no | no | no | no | no | no | no |

| | embodiment 12 | embodiment 13 | embodiment 14 | embodiment 15 | embodiment 16 | embodiment 17 | embodiment 18 |
|---|---|---|---|---|---|---|---|
| number of core segments | 8 | 8 | 8 | 8 | 8 | 8 | 10 |
| maximum width W of core-mold main portion (mm) | 238 | 238 | 238 | 238 | 238 | 238 | 238 |
| width Bd between toe-end shaping positions (mm) | 201 | 201 | 201 | 201 | 201 | 201 | 201 |
| ratio Bd/W | 0.84 | 0.84 | 0.84 | 0.84 | 0.84 | 0.84 | 0.84 |
| maximum angle (alpha) in inside zone (deg.) | 44 | 44 | 44 | 44 | 40 | 44 | 44 |
| length h of oblique part (mm) | 17 | 17 | 17 | 17 | 12 | 12 | 17 |
| length H (mm) | 79 | 79 | 79 | 79 | 79 | 79 | 79 |
| ratio h/H | 0.22 | 0.22 | 0.22 | 0.22 | 0.15 | 0.15 | 0.22 |
| length Hr of inverse arc part (mm) | 8.0 | 8.5 | 14.0 | 16.0 | 8.0 | 10.0 | 10.0 |
| ratio Hr/h | 0.47 | 0.50 | 0.82 | 0.94 | 0.67 | 0.83 | 0.59 |
| cycle time of core-mold taking-out step (sec.) | 258 | 230 | 199 | 195 | 197 | 189 | 210 |
| damage of tire inner surface after taking out core mold | no | no | no | present | no | no | no |

From the test results, it was confirmed that the rigid core molds as the Embodiments shorten the cycle time of the core-mold taking-out step, while preventing damage to the inner surface of the pneumatic tire.

DESCRIPTION OF REFERENCE SIGNS 10 rigid core mold
11 core-mold main portion
14 core segment
18 molding surface
30 inside zone
32 oblique part
34 maximum inclination position
38 inverse arc part

The invention claimed is:

1. A rigid core mold for manufacturing a pneumatic tire, wherein said pneumatic tire is a toroidal pneumatic tire including a tread portion, a pair of sidewall portions, and a pair of bead portions, said mold comprising:

an annular core-mold main portion composed of core segments arranged in a tire circumferential direction and each taken out from the toroidal pneumatic tire by moving inwardly in a tire radial direction, wherein the core-mold main portion has a molding surface for shaping the inner surface of the toroidal pneumatic tire, the molding surface comprises regions for shaping inner surfaces of the respective sidewall portions wherein a maximum width W in the tire axial direction of the molding surface lies between the regions, toe-end shaping positions for shaping toe ends of the respective bead portions, and an inside zone of the molding surface as extending outwardly in the tire radial direction from each of the toe-end shaping positions to a position on one of said regions at the maximum width W, wherein the width in the tire axial direction of the molding surface measured between the inside zones, is gradually decreased toward the inside in the tire radial direction so that the width Bd measured at the toe-end shaping positions becomes not less than 0.80 times the maximum width W, and in a meridian section of the core-mold main portion including its axis corresponding to a tire revolution axis, each of the inside zones is defined as having an angle α of not more than 45 degrees with respect to the tire radial direction, and the inside zone includes an oblique part defined as having the angle α in a range from 30 to 45 degrees, and the oblique part has a dimension h in the tire radial direction of less than 0.25 times a dimension H in the tire radial direction measured from the toe-end shaping position to an intersecting point P of a line drawn in the tire radial direction from the toe-end shaping position, outwardly in the radial direction with the molding surface.

2. The rigid core mold as set forth in claim 1, wherein in said meridian section, each said inside zone is provided with a maximum inclination position at which the angle α becomes maximum, and an inverse arc part positioned on the inside in the tire radial direction of the maximum inclination position and the inverse arc part is formed by a circular arc whose center is positioned on the axially outside of the inside zone.

3. The rigid core mold as set forth in claim 2, wherein the ratio Hr/h of the dimension Hr in the tire radial direction of said inverse arc part and said dimension h is 0.50 to 0.83.

4. The rigid core mold as set forth in claim 2, wherein the angle α at the maximum inclination position is 40 to 44 degrees.

5. The rigid core mold as set forth in claim 1, wherein the ratio Bd/W of the width Bd to the maximum width W is 0.80 to 0.84.

6. The rigid core mold as set forth in claim 1, wherein the ratio h/H of the dimension h to the dimension H is 0.15 to 0.22.

7. A method for manufacturing a pneumatic tire utilizing the rigid core mold as set forth in claim 1, which is characterized by including
a green tire forming step for forming a green tire by applying unvulcanized tire constructional members on an outer surface of the rigid core mold in series,
a vulcanization step for putting the green tire in a vulcanization mold together with the rigid core mold and vulcanization-molding it, and
a core-mold taking-out step for taking out each core segment from the pneumatic tire after the vulcanization-molding by moving each core segment inwardly in the tire radial direction.

8. The rigid core mold as set forth in claim 3, wherein the angle α at the maximum inclination position is 40 to 44 degrees.

9. The rigid core mold as set forth in claim 2, wherein the ratio Bd/W of the width Bd to the maximum width W is 0.80 to 0.84.

10. The rigid core mold as set forth in claim 3, wherein the ratio Bd/W of the width Bd to the maximum width W is 0.80 to 0.84.

11. The rigid core mold as set forth claim 4, wherein the ratio Bd/W of the width Bd to the maximum width W is 0.80 to 0.84.

12. The rigid core mold as set forth in claim 2, wherein the ratio h/H of the dimension h to the dimension H is 0.15 to 0.22.

13. The rigid core mold as set forth in claim 3, wherein the ratio h/H of the dimension h to the dimension H is 0.15 to 0.22.

14. The rigid core mold as set forth in claim 4, wherein the ratio h/H of the dimension h to the dimension H is 0.15 to 0.22.

15. The rigid core mold as set forth in claim 5, wherein the ratio h/H of the dimension h to the dimension H is 0.15 to 0.22.

16. A method for manufacturing a pneumatic tire utilizing the rigid core mold as set forth in claim 2, which is characterized by including
a green tire forming step for forming a green tire by applying unvulcanized tire constructional members on an outer surface of the rigid core mold in series,
a vulcanization step for putting the green tire in a vulcanization mold together with the rigid core mold and vulcanization-molding it, and
a core-mold taking-out step for taking out each core segment from the pneumatic tire after the vulcanization-molding by moving each core segment inwardly in the tire radial direction.

17. A method for manufacturing a pneumatic tire utilizing the rigid core mold as set forth in claim 3, which is characterized by including
a green tire forming step for forming a green tire by applying unvulcanized tire constructional members on an outer surface of the rigid core mold in series,
a vulcanization step for putting the green tire in a vulcanization mold together with the rigid core mold and vulcanization-molding it, and
a core-mold taking-out step for taking out each core segment from the pneumatic tire after the vulcanization-molding by moving each core segment inwardly in the tire radial direction.

18. A method for manufacturing a pneumatic tire utilizing the rigid core mold as set forth in claim 4, which is characterized by including
a green tire forming step for forming a green tire by applying unvulcanized tire constructional members on an outer surface of the rigid core mold in series,
a vulcanization step for putting the green tire in a vulcanization mold together with the rigid core mold and vulcanization-molding it, and
a core-mold taking-out step for taking out each core segment from the pneumatic tire after the vulcanization-molding by moving each core segment inwardly in the tire radial direction.

19. A method for manufacturing a pneumatic tire utilizing the rigid core mold as set forth in claim 5, which is characterized by including
a green tire forming step for forming a green tire by applying unvulcanized tire constructional members on an outer surface of the rigid core mold in series,
a vulcanization step for putting the green tire in a vulcanization mold together with the rigid core mold and vulcanization-molding it, and
a core-mold taking-out step for taking out each core segment from the pneumatic tire after the vulcanization-molding by moving each core segment inwardly in the tire radial direction.

20. A method for manufacturing a pneumatic tire utilizing the rigid core mold as set forth in claim 6, which is characterized by including
a green tire forming step for forming a green tire by applying unvulcanized tire constructional members on an outer surface of the rigid core mold in series,
a vulcanization step for putting the green tire in a vulcanization mold together with the rigid core mold and vulcanization-molding it, and
a core-mold taking-out step for taking out each core segment from the pneumatic tire after the vulcanization-molding by moving each core segment inwardly in the tire radial direction.

21. The rigid core mold as set forth in claim 1, wherein the core segments are split in the tire circumferential direction but are not split in the tire axial direction.

* * * * *